(12) United States Patent
Chen

(10) Patent No.: US 7,377,636 B2
(45) Date of Patent: May 27, 2008

(54) LIFTABLE EYEGLASSES

(76) Inventor: Chin-Jen Chen, No. 39-7, Liu Kuai Liao, Liu Chia Village, An Ting Hsiang, Tainan Hsien (TW)

( * ) Notice: Subject to any disclaimer, the term of this patent is extended or adjusted under 35 U.S.C. 154(b) by 0 days.

(21) Appl. No.: 11/517,412

(22) Filed: Sep. 8, 2006

(65) Prior Publication Data
US 2008/0074608 A1    Mar. 27, 2008

(51) Int. Cl.
*G02C 5/14* (2006.01)
(52) U.S. Cl. .................. 351/120; 351/121; 351/153
(58) Field of Classification Search ............... 351/111, 351/120, 121, 153
See application file for complete search history.

(56) References Cited
U.S. PATENT DOCUMENTS 3,907,410 A * 9/1975 Richmond et al. .......... 351/119
4,527,291 A * 7/1985 Nussbickl .................. 2/450
5,760,867 A * 6/1998 Pernicka et al. ............ 351/120
5,980,038 A * 11/1999 Chen ......................... 351/120

* cited by examiner

*Primary Examiner*—Huy K Mai
(74) *Attorney, Agent, or Firm*—Rosenberg, Klein & Lee

(57) ABSTRACT

A pair of eyeglasses comprise a temple, and a connecting member; the connecting member is pivoted to a connecting end of the temple; the connecting end has notches on a lateral side; the connecting member is pivoted to a connecting end of the rim; the connecting member has inner and outer lateral wall portions, and a hollowness between the lateral wall portions; the outer lateral wall portion has toothed parts; the temple is fitted in the hollowness, and pivoted to the lateral wall portions of the connecting member with the toothed parts of the connecting member fitting on the notches for the temple to grip the connecting member after the rim is pivoted up and down relative to the temple together with the connecting member; the temple has a stopping part, and the connecting member has a stopping block in the hollowness to work with the stopping part.

2 Claims, 7 Drawing Sheets

LIFTABLE EYEGLASSES

BACKGROUND OF THE INVENTION

1. Field of the Invention

The present invention relates to a pair of liftable eyeglasses, more particularly one, which allows the wearer to pivot the rim upwards relative to the temple to a not-in-use position if he/she doesn't want to look through the eyeglasses temporarily.

2. Brief Description of the Prior Art

Referring to FIG. 1, a kind of currently existing eyeglasses comprise a connecting member 91, a temple 92, and a rim 93.

The connecting member 91 has an end portion 911, and a lateral arm portion 913 extending from the end portion 911. The end portion 911 has a connecting hole 912, and several notches 915 thereon. The lateral arm portion 913 has a protruding portion 914 on a lateral side thereof.

The rim 93 has a holding space 931 in one end, and through holes 932 above and under the holding space 931. The connecting member 91 is received in the hollowness 931 of the rim 93 at the end portion 911, and pivoted to rim 93 by means of a threaded element 4, which is passed through the through holes 932 as well as the connecting hole 912 of the connecting member 91.

The temple 92 has a front hollow fitting portion 921, a lateral through hole 922 communicating with the front hollow fitting portion 921, and a toothed part 923 on a front end. The connecting member 91 is passed into the front hollow fitting portion 921 of the temple 92 at the lateral arm portion 913, with the protruding portion 914 being fitted in the lateral through hole 922, and with the toothed part 923 fitting on the notches 915. Therefore, the rim 93 together with the connecting member 91 can be pivoted relative to the temple 92 to adjust position.

Although the wearer is allowed to pivot the rim up and down relative to the temple to adjust the rim to a desirable position, he will have to take off the eyeglasses, and hold them or put them in a proper place if he doesn't want to look through the eyeglasses temporarily. Therefore, the eyeglasses aren't convenient to use.

SUMMARY OF THE INVENTION

It is a main object of the invention to provide an improvement on a pair of eyeglasses to overcome the above-mentioned problem. The eyeglasses of the present invention comprise a temple, and a connecting member. The connecting member is pivoted to a connecting end of the temple, which connecting end has notches on a lateral side thereof. The connecting member is pivoted to a connecting end of the rim at the other end. The connecting member has inner and outer lateral wall portions, and hollowness between the lateral wall portions; the outer lateral wall portion has toothed parts. The temple is fitted in the hollowness, and pivoted to the lateral wall portions of the connecting member with the toothed parts of the connecting member fitting on the notches for the temple to grip the connecting member after the rim is pivoted up and down relative to the temple together with the connecting member. Therefore, the wearer is allowed to pivot the rim upwards relative to the temple to a not-in-use position when wearing the eyeglasses.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
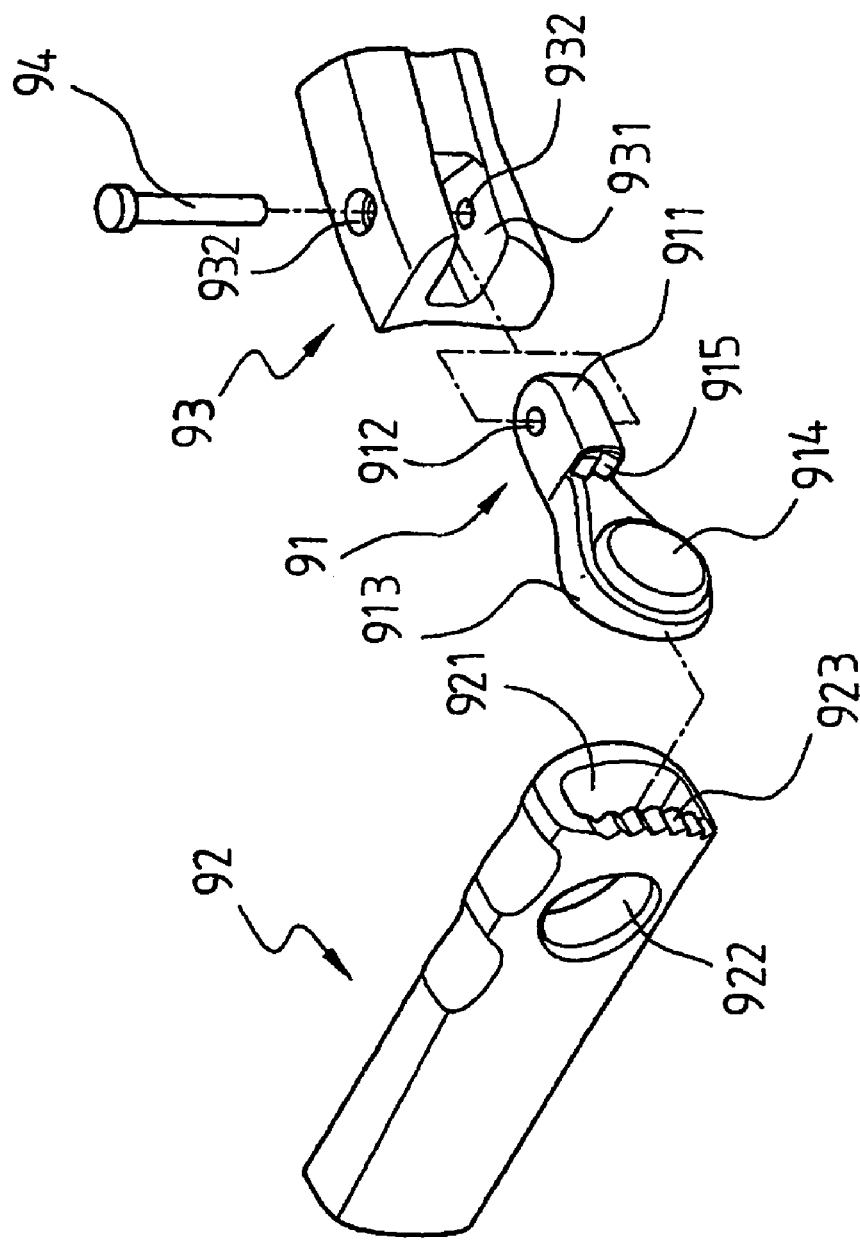
FIG. 1 is a fragmentary exploded perspective view of the prior art.
Figure 2:
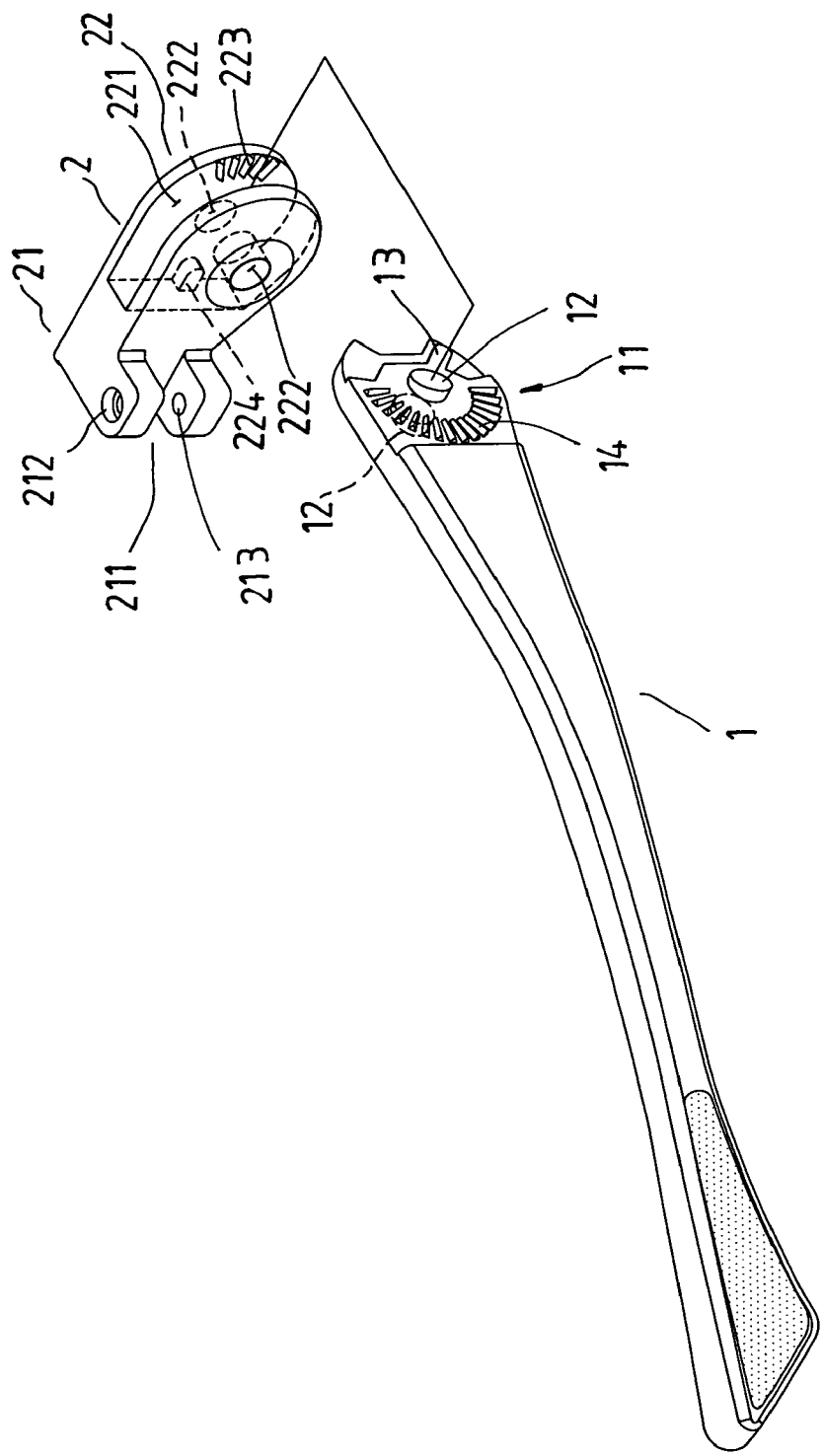
FIG. 2 a fragmentary exploded perspective view of the present invention.
Figure 3:
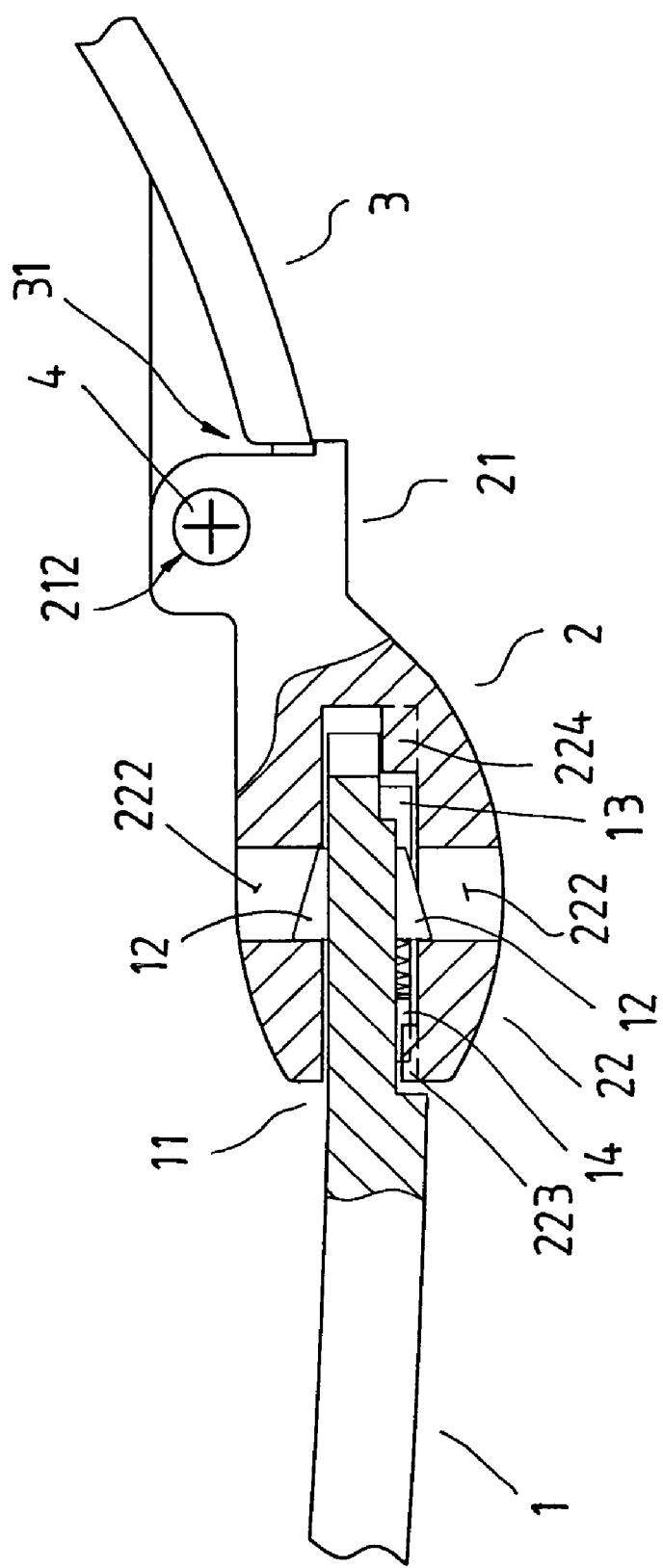
FIG. 3 is a partial sectional view of the present invention.
Figure 4:
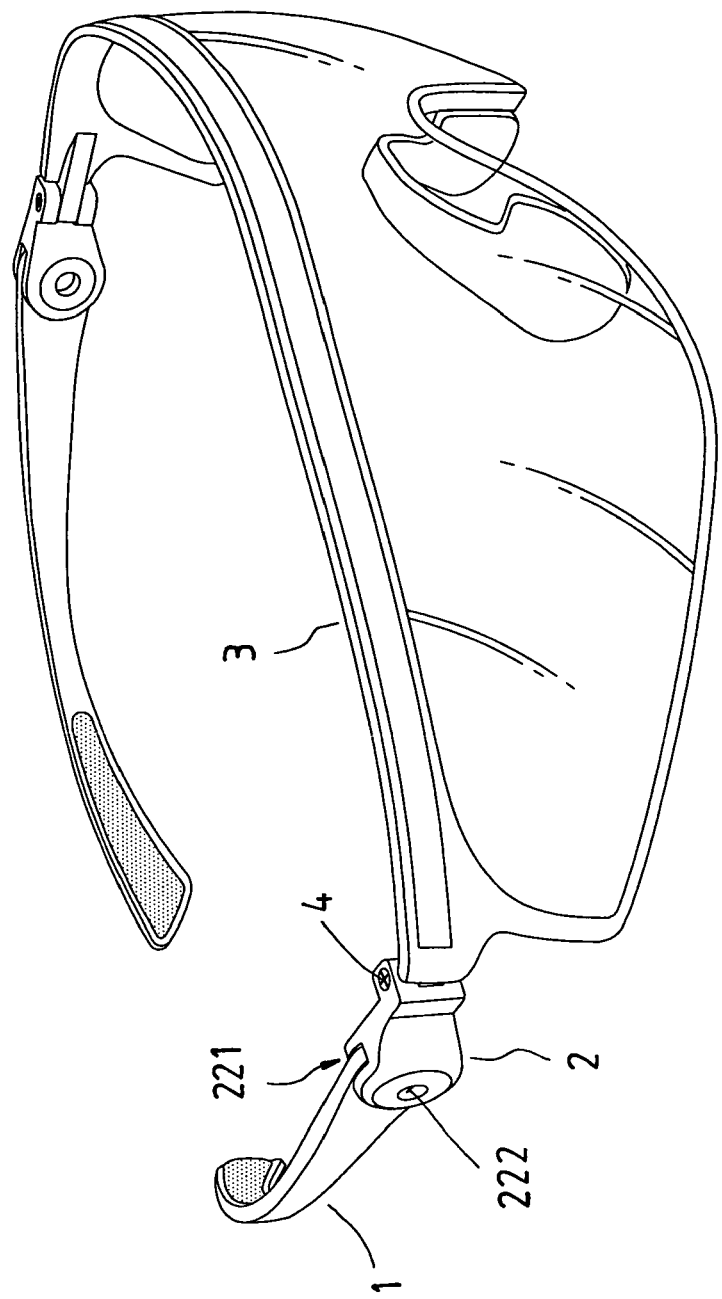
FIG. 4 is a perspective view of the present invention.

Referring to FIGS. 2 to 7, a preferred embodiment of a pair of eyeglasses are provided, which can be ones for short-sighted persons, presbyopic glasses, sunglasses, sport eyeglasses or industrial eyeglasses, and which comprise:

a temple 1, the temple 1 has stud-shaped pivotal portions 12 on inward and outward sides of a connecting end 11 thereof; the connecting end 11 has a stopping part 13 on a front peripheral portion thereof, which is in front of the stud-shaped pivotal portions 12; the connecting end 11 has several notches 14 on a rear peripheral portion thereof, which is behind the pivotal portions 12;

a rim 3 having a connecting end 31 with a through hole; and a connecting member 2, the connecting member 2 has an end portion 21 at a front end, and a coupling portion 22 extending from the end portion 21; the end portion 21 has upper and lower wall portions, and a holding hollowness 211 between the upper and the lower wall portions; the upper wall portion has a screw hole 212, and the lower wall portion has a fitting hole 213 facing the screw hole 212 of the upper wall portion; the rim 3 is inserted in the holding hollowness 211 at the connecting end 31, and a threaded element 4 is passed through the threaded hole 212 of the upper wall portion, the through hole of the connecting end 31 of the rim 3, and the fitting hole 213 of the lower wall portion such that the connecting member 2 is pivoted to the rim 3.

The coupling portion 22 of the connecting member 2 has inner and outer lateral wall portions, and a fitting hollowness 221 between the lateral wall portions; the lateral wall portions have opposing through holes 222; the outer lateral wall portion of the coupling portion 22 has toothed parts 223 near to an edge thereof; the coupling portion 22 has a stopping block 224 in the fitting hollowness 221 thereof. The temple 1 is fitted in the fitting hollowness 221 of the connecting member 2, and pivoted to the connecting member 2 with the pivotal portions 12 being passed into respective ones of the through holes 222 of the lateral wall portions of the coupling portion 22; thus, the toothed parts 223 of the connecting member 2 fit on the notches 14 of the connecting end 11 for allowing the temple 1 to grip the connecting member 2, and in turn the connecting member 2 together with the rim 3 are usually prevented from pivoting relative to the temple 1.

Figure 5:
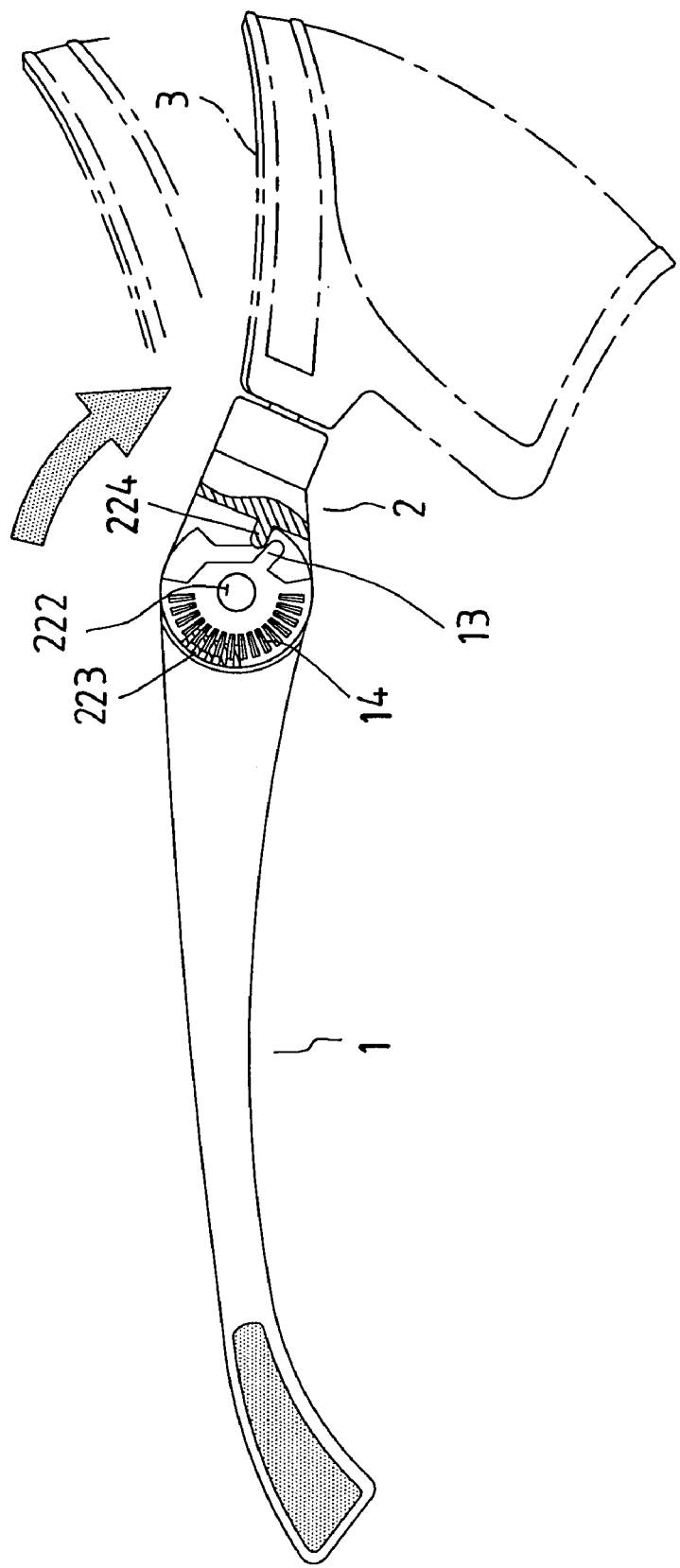
FIG. 5 is a side view of the present invention, taken when the front is pivoted down to the in-use position.
Figure 6:
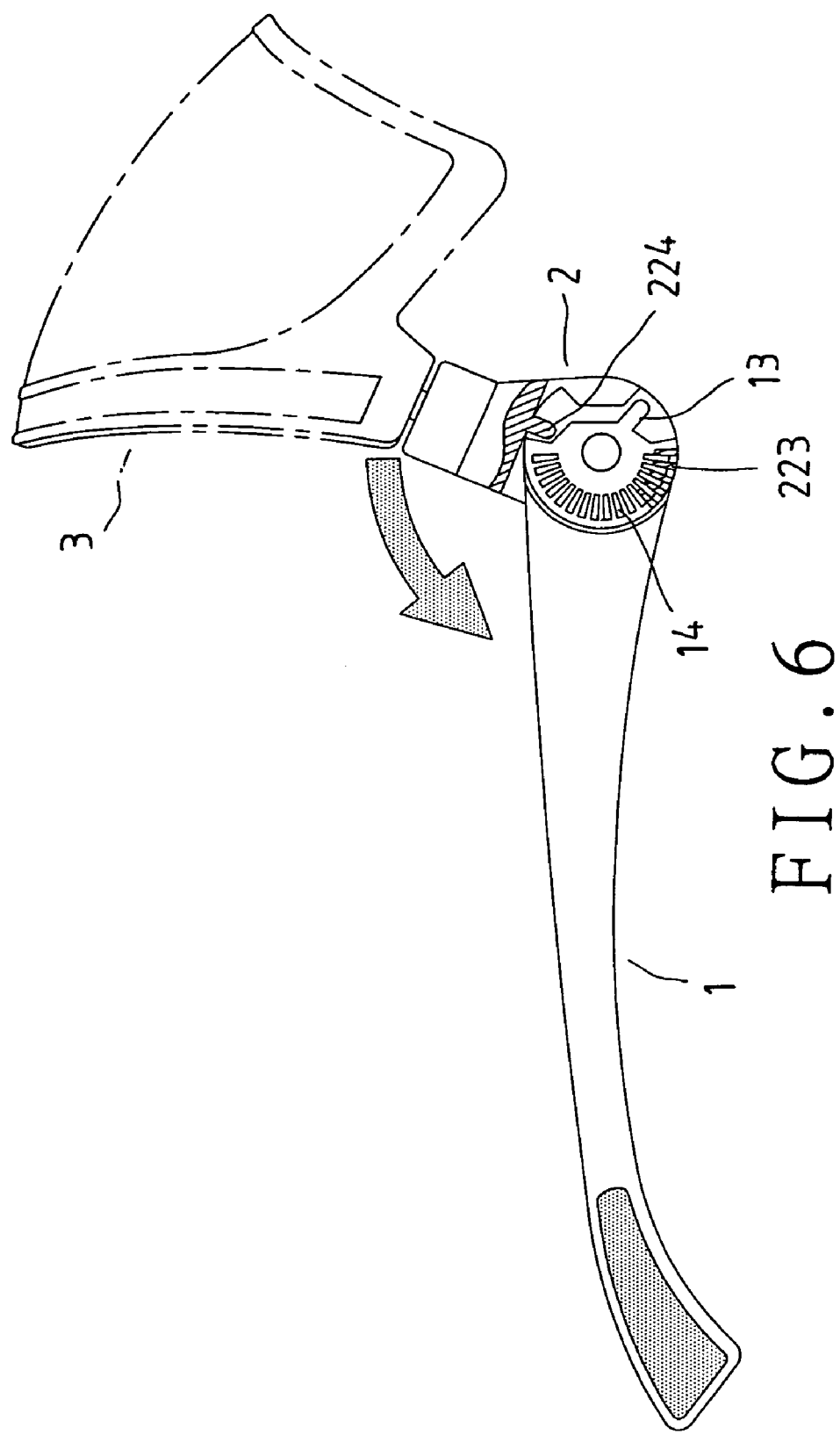
FIG. 6 is a side view of the present invention, taken when the front is lifted to the not-in-use position.

Furthermore, when the rim 3 together with the connecting member 2 are pivoting down relative to the temple 1 as shown in FIG. 5, the stopping block 224 of the connecting member 2 will come into contact with and be stopped by the stopping part 13 of the temple 13 for the rim 3 together with the connecting member 2 to stop at a certain position. When the rim 3 together with the connecting member 2 are pivoting upwards relative to the temple 1 to the lifted not-in-use position near to the wearer's forehead, as shown in FIG. 6, the stopping block 224 of the connecting member 2 will move gradually away from the stopping part 13 of the temple 1, not going to hinder the upward pivotal motion of the rim 3 and the connecting member 2. The temple 1 will prevent the connecting member 2 from accidentally pivoting down from the lifted not-in-use position owing to the contact between the notches 14 of the connecting end 11 and the toothed parts 224 of the connecting member 2.

Figure 7:
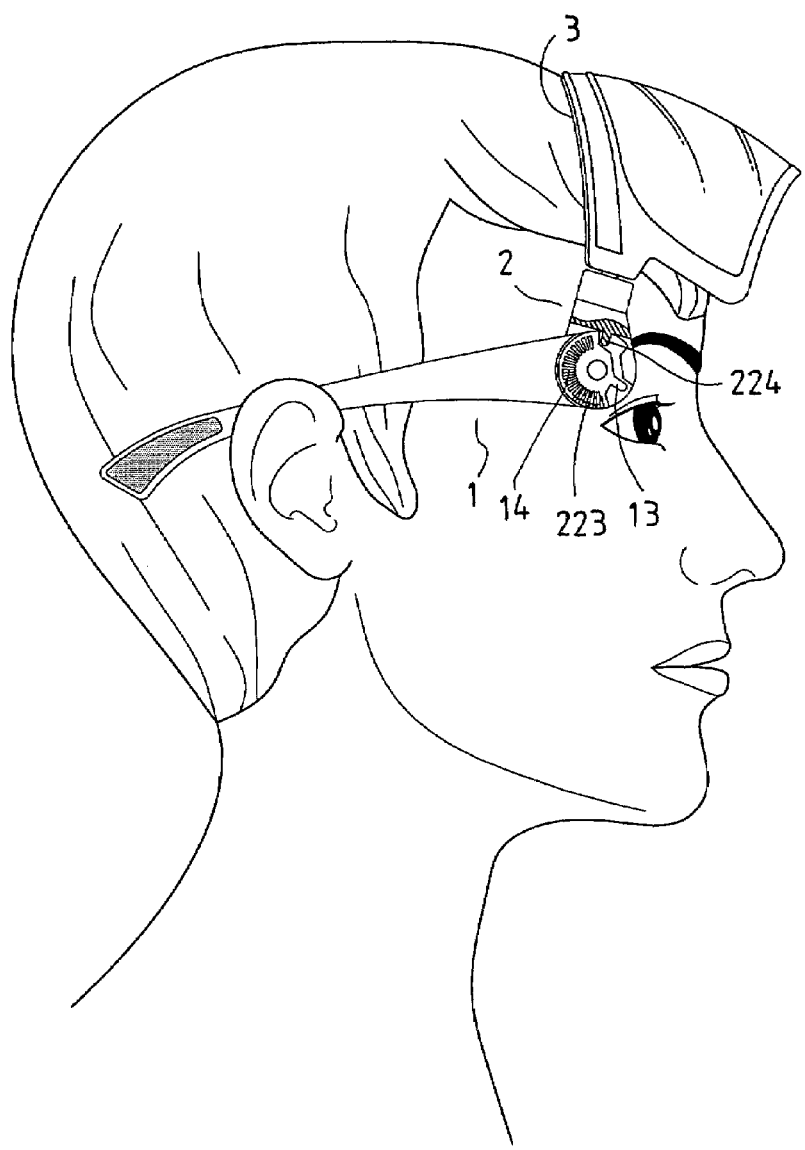
FIG. 7 is a view showing use of the present invention.

Referring to FIGS. 2 to 7 again, because the temple 1 is pivoted to the coupling portion 22 of the connecting member 2 at the pivotal portions 12 thereof, and the rim 3 is joined to the end portion 21 of the connecting member 2, the rim 3 together with the connecting member 2 can be pivoted up and down relative to the temple 1. Referring to FIG. 7, when the eyeglasses are worn on a person's face, the wearer is allowed to lift the rim 3 to a not-in-use position in front of the wearer's forehead if he/she doesn't want to look through the eyeglasses temporarily; in other words, the wearer don't need to take off the eyeglasses. Furthermore, after the rim 3 and the connecting member 2 are pivoted to the lifted not-in-use position, the temple 1 will grip the connecting member 2 with the toothed parts 224 of the connecting member 2 fitting on the notches 14 of the connecting end 11, thus preventing the rim 3 and the connecting member 2 from pivoting down relative to the temple 1 accidentally. In addition, the stopping part 13 of the temple 13 is in the way of the stopping block 224 of the connecting member 2, and in turn the rim 3 and the connecting member 2 will be stopped at a certain position by the stopping part 13 while they are pivoting down relative to the temple 1; the stopping part 13 of the temple 13 won't hinder motion of the rim 3 and the connecting member 2 when the rim 3 is pivoting upwards to the lifted not-in-use position together with the connecting member 2.

From the above description, it can be seen that the eyeglasses of the present invention has the following advantages:

1. The rim and the connecting member can't pivot relative to the temple accidentally because the temple will grip the connecting member with the toothed parts of the connecting member fitting on the notches of the connecting end thereof. Consequently, the rim will stay in position after it is pivoted up and down to a new angle.

2. The stopping part of the temple will stop the stopping block of the connecting member so as to prevent the rim and the connecting member from moving further down after the rim and the connecting member are pivoted down to a certain position. The stopping part of the temple won't hinder motion of the rim and the connecting member when the rim and the connecting member are pivoting upwards. Therefore, when the eyeglasses are worn on a person's face, the rim can be lifted to the not-in-use position next to the wearer's forehead. In other words, the wearer won't have to take off the eyeglasses when he/she doesn't want to look through the eyeglasses.

What is claimed is:

1. Liftable eyeglasses, comprising:

a temple, the temple having pivotal portions on inward and outward sides of a connecting end thereof; the connecting end having a stopping part on one end of a peripheral portion thereof; the connecting end having a plurality of notches formed on the outer wall of said peripheral portion of said connecting end;

a rim, the rim having a connecting end; and a connecting member, the connecting member having an end portion; the connecting member being pivoted to the connecting end of the rim at the end portion thereof;

the connecting member having a coupling portion extending from the end portion thereof; the coupling portion having inner and outer lateral wall portions, and a fitting hollowness between the lateral wall portions; the lateral wall portions having opposing through holes; the outer lateral wall portion of the coupling portion having a plurality of toothed parts formed on the inner wall of a peripheral portion of said coupling portion;

the temple being fitted in the fitting hollowness, and pivoted to the connecting member with the pivotal portions thereof being passed into respective ones of the through holes of the lateral wall portions of the coupling portion, and with the toothed parts of the connecting member fitting on the notches of the connecting end of the temple for the temple to grip the connecting member wherein the connecting end is sandwiched between opposing lug members of said connecting member for encapsulation of said connecting end within said connecting member; the coupling portion of the connecting member having a stopping block in the fitting hollowness thereof, which will meet and be stopped by the stopping part of the temple when the rim and the connecting member together are pivoting relative to the temple.

2. The liftable eyeglasses as recited in claim 1, wherein the connecting end of the rim has a through hole, and the end portion of the connecting member has upper and lower wall portions, and a holding hollowness between the upper and the lower wall portions; the upper wall portion having a screw hole; the lower wall portion having a fitting hole facing the screw hole of the upper wall portion; the rim being inserted in the holding hollowness of the end portion of the connecting member at the connecting end thereof, and pivoted to the connecting member by means of a threaded element passed through the threaded hole, the through hole as well as the fitting hole.

* * * * *